United States Patent
Fedane

(10) Patent No.: US 6,990,125 B1
(45) Date of Patent: Jan. 24, 2006

(54) AUTO-DETECTION OF ISDN BRI SERVICES

(75) Inventor: Rohit Anand Fedane, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/684,161

(22) Filed: Oct. 10, 2003

Related U.S. Application Data

(63) Continuation of application No. 09/406,249, filed on Sep. 27, 1999, now Pat. No. 6,633,549.

(51) Int. Cl.
*H04J 3/12* (2006.01)

(52) U.S. Cl. .................... 370/524; 370/264; 379/93.07
(58) Field of Classification Search ................ 370/259, 370/264, 367; 379/90.01, 93.05, 93.06, 93.07, 379/93.08, 93.09
See application file for complete search history.

(56) References Cited

U.S. PATENT DOCUMENTS

| | | | | |
|---|---|---|---|---|
| 5,883,883 A | * | 3/1999 | Baker et al. | 370/250 |
| 5,907,549 A | * | 5/1999 | Nagao | 370/384 |
| 6,501,838 B2 | * | 12/2002 | Brachman et al. | 379/211.02 |

OTHER PUBLICATIONS

Telenetworks, "Auto SPID Selection and Auto Switch Detection", downloaded Aug. 30, 1999 published on web, p. 1.

* cited by examiner

*Primary Examiner*—Ajit Patel
*Assistant Examiner*—Steven Blount
(74) *Attorney, Agent, or Firm*—Marger Johnson & McColl

(57) ABSTRACT

A method and apparatus for auto-detection of ISDN BRI services available for use by terminal equipment is disclosed. This auto-detection provides a variety of simulated call activity stimuli to the ISDN switch peered with the terminal equipment, thus exercising secondary ISDN features such as call conferencing, call forward, call transfer, and X.25/D channel data transfer capability in a manner that can be detected by the terminal equipment. For instance, the call conferencing feature can be detected by having the terminal equipment place a call to it's own directory number using one B-channel, answering the call on the other B-channel, and then attempting to add a third party to this call. By evaluating the messages returned from the switch during the attempted third party addition, the auto-detection process can determine whether the call conferencing feature is available.

Using this and similar procedures, initial setup, configuration, use, and troubleshooting of an ISDN connection can be greatly simplified. Setup and configuration can be automated to default to include all detected features. Or, the detected features can be displayed in a network management agent, allowing customized local activation of the available features.

20 Claims, 4 Drawing Sheets

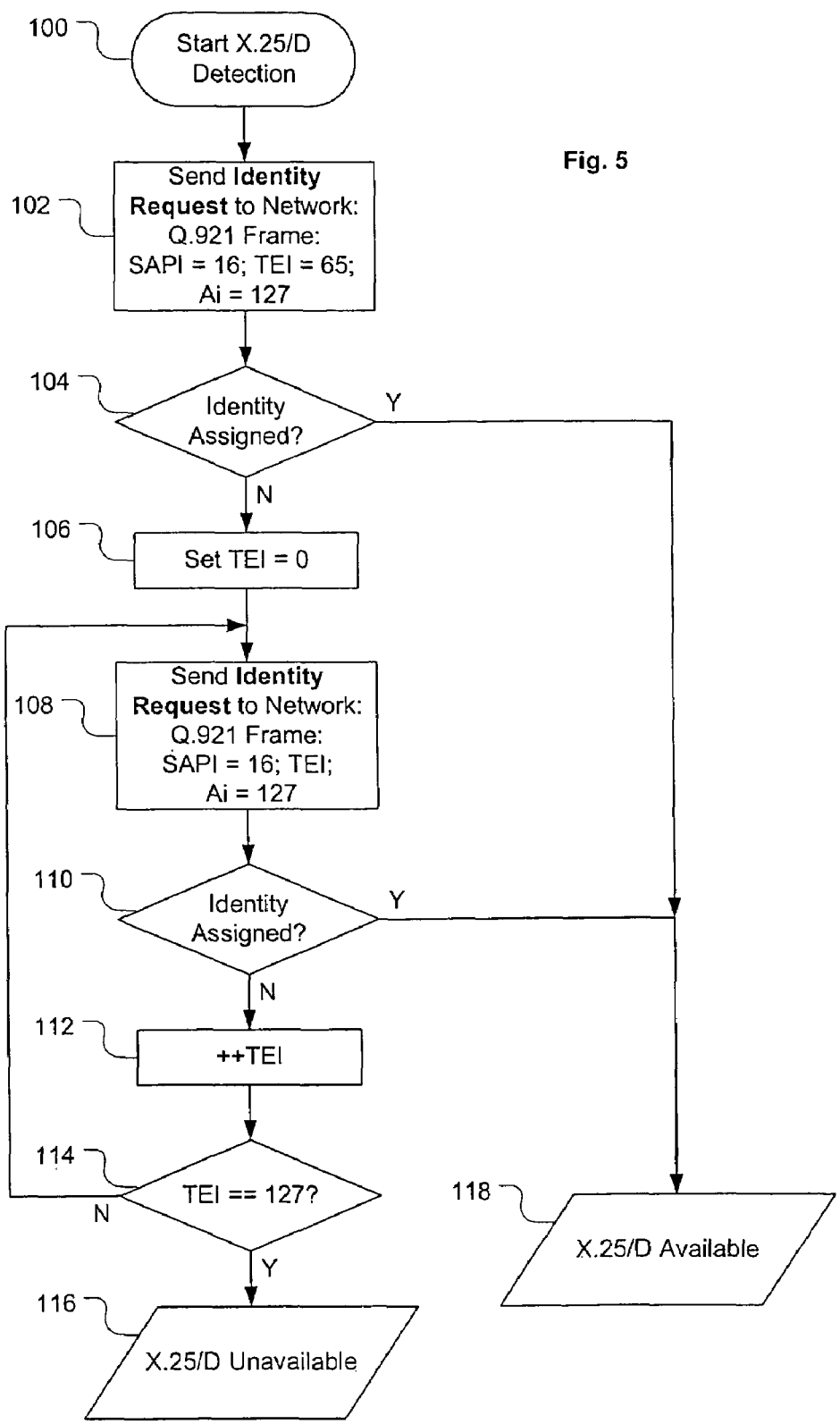

AUTO-DETECTION OF ISDN BRI SERVICES

This application is a continuation of prior U.S. Ser. No. 09/406,249, filed Sep. 27, 1999 U.S. Pat. No. 6,633,549.

FIELD OF THE INVENTION

This invention pertains generally to Integrated Services Digital Network (ISDN) terminal equipment, and more specifically to the configuration and setup of ISDN features on terminal equipment.

BACKGROUND OF THE INVENTION

ISDN offers customers a digital connection to their telephone service provider, using the same phone lines that are used for conventional analog phone service. FIG. 1 illustrates ISDN Basic Rate Interface (BRI) service, which operates across a single twisted pair local loop 22 (the U interface in ISDN terminology). One end of local loop 22 terminates at the telephone service provider's ISDN switch 24, typically located at a central office. ISDN switch 24 connects in turn to network 26, allowing ISDN customers to connect, e.g., calls to circuit-switched telephone equipment 28, or data connections to packet-switched data terminal equipment 30.

At the customer's end of local loop 22, a network termination 32 converts between the U interface signal and a four-wire S/T interface digital signal (a T interface is point-to-point, while an S interface is point-to-multipoint). An S interface 34 is shown connected to several types of terminal equipment. ISDN telephone 36 is provisioned for direct connection to S interface 34. Router 38 is also provisioned for communication over S interface 34, and connects, e.g., to local area network 40. Terminal adapter 42 formats conventional analog circuit-switched signals, e.g., from an analog telephone 44 or an analog computer modem 46, to an ISDN digital carrier format. Other types of terminal equipment, such as PBX equipment, credit card authorizers, etc., (not shown) may also connect to S interface 34.

ISDN BRI service provides three bi-directional channels on an ISDN connection. Two of these channels are B (bearer) channels, B1 and B2, and the third channel is a D (delta) channel. Each B channel has a 64 kbps (thousand bits per second) data rate, and can be used for voice or data. Thus at any given time, an ISDN BRI can support, e.g., two voice calls, or a voice call on B1 and packet data transfer on B2, or 128 kbps packet data transfer using both B1 and B2. The D channel has a 16 kbps data rate, and is used for exchanging call set up and signaling messages for the B channels. The D channel can also be used to send and receive X.25 packet data.

One disadvantage of ISDN is that setting up and configuring terminal equipment can often be a daunting task for a novice. For instance, when equipment is physically connected to an ISDN line, the basic layer 2 transport mechanism is enabled. But most useful communications with the provider's ISDN switch will be disabled unless the terminal equipment knows its Service Profile Identifier (SPID), which is usually its 10-digit directory number with or without other strings of digits concatenated with it. It is also useful if the terminal equipment knows the type of ISDN switch it is connected to, since each type of switch may have certain functional peculiarities that can be compensated for by the terminal equipment. Finally, there are also a range of secondary data and/or voice services/features that may or may not be implemented on this particular ISDN switch and/or line.

Recent advances in ISDN have created a mechanism whereby terminal equipment can automatically obtain a list of valid SPIDs from the switching system, allowing the equipment to auto-configure its SPID. An Automatic Switch Detection process also now allows terminal equipment to determine the type of ISDN switch (e.g., 5ESS, DMS-100) that it is connected to. But no mechanism currently exists for automatically determining which, if any, secondary services/features are available on the ISDN line.

SUMMARY OF THE INVENTION

Currently, the only way to know if ISDN secondary services/features exist on an ISDN line is to examine the provisioning information obtained from the ISDN service provider. Quite often this information is inaccurate or not readily available. And to a novice, this information may not make much sense even when it is available.

The embodiments described herein provide for auto-detection of various ISDN supplementary services or features. These embodiments greatly increase the usability of an equipped device. For instance, the available supplementary services can be summarized for the user, making setup, debug, and device use easier. Network management software can also use information about available services to auto-configure the device, flag conflicts between the present configuration and the available services, and/or present configuration options that show only available features. Finally, during troubleshooting, the auto-detection information can be used to locate configuration problems, rule out problems at the switch, etc., without the troubleshooter having to decode cryptic messaging between the switch and the terminal equipment.

In one aspect, the present invention comprises a method for operating ISDN terminal equipment connected to an ISDN network via an interface having at least two B-channels and one D-channel. The method transmitting an auto-request, for an ISDN transaction that exercises an ISDN supplementary service, to the ISDN network across the ISDN D-channel, and receiving an acknowledgment across the D-channel related to the auto-request. The acknowledgment is evaluated to determine whether the auto-request was successful.

In a second aspect, the present invention comprises an ISDN terminal endpoint having an ISDN communication protocol stack and an automatic supplementary service detector. The automatic supplementary service detector communicates with the ISDN communication protocol stack to generate an auto-request for an ISDN transaction that exercises an ISDN supplementary service, and to evaluate the success of the auto-request. Based on the results of this request, the detector preferably provides an indication of whether the supplementary service is available for use.

In a further aspect, the present invention comprises a computer-readable medium containing a program for detecting whether one or more ISDN supplementary services are available on an ISDN BRI, the program having an auto-request generator, an auto-request evaluator, and a service availability indicator.

BRIEF DESCRIPTION OF THE DRAWING

The invention may be best understood by reading the disclosure with reference to the drawing, wherein:

FIG. 5 shows a process for implementing auto-detection of X.25/D channel availability according to an embodiment of the invention.

DETAILED DESCRIPTION OF THE PREFERRED EMBODIMENTS

The following terms have defined meanings within this specification. An ISDN terminal endpoint is a customer-end ISDN device having at least layer 2 and layer 3 ISDN protocol stack functionality—the device may connect to an ISDN line at the S, T, or U interface. An ISDN communication protocol stack includes at least ISDN layer 2 (e.g., Q.931) and ISDN layer 3 (e.g., Q.921) functionality. An ISDN supplementary service is a service that provides more than just basic B channel call completion—for example, D channel data service, or call services such as call hold, call conferencing, call waiting, call transfer, and call forward. An auto-request is a service request that is generated by a terminal endpoint in order to determine the availability of the service. Finally, a device configuration register provides for storing the results of automatic supplementary service detection.

Figure 1:
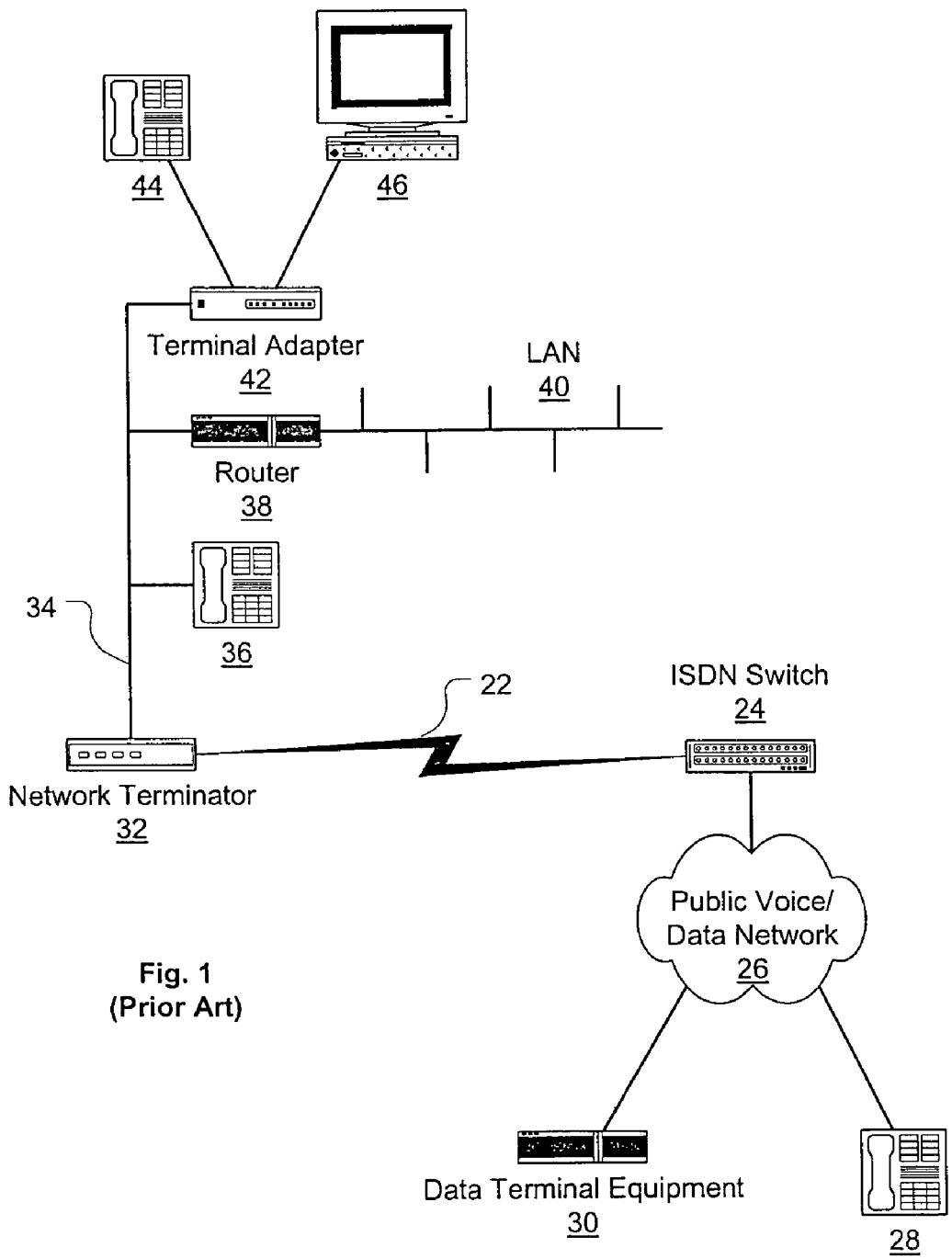
FIG. 1 provides an ISDN system overview.
Figure 2:
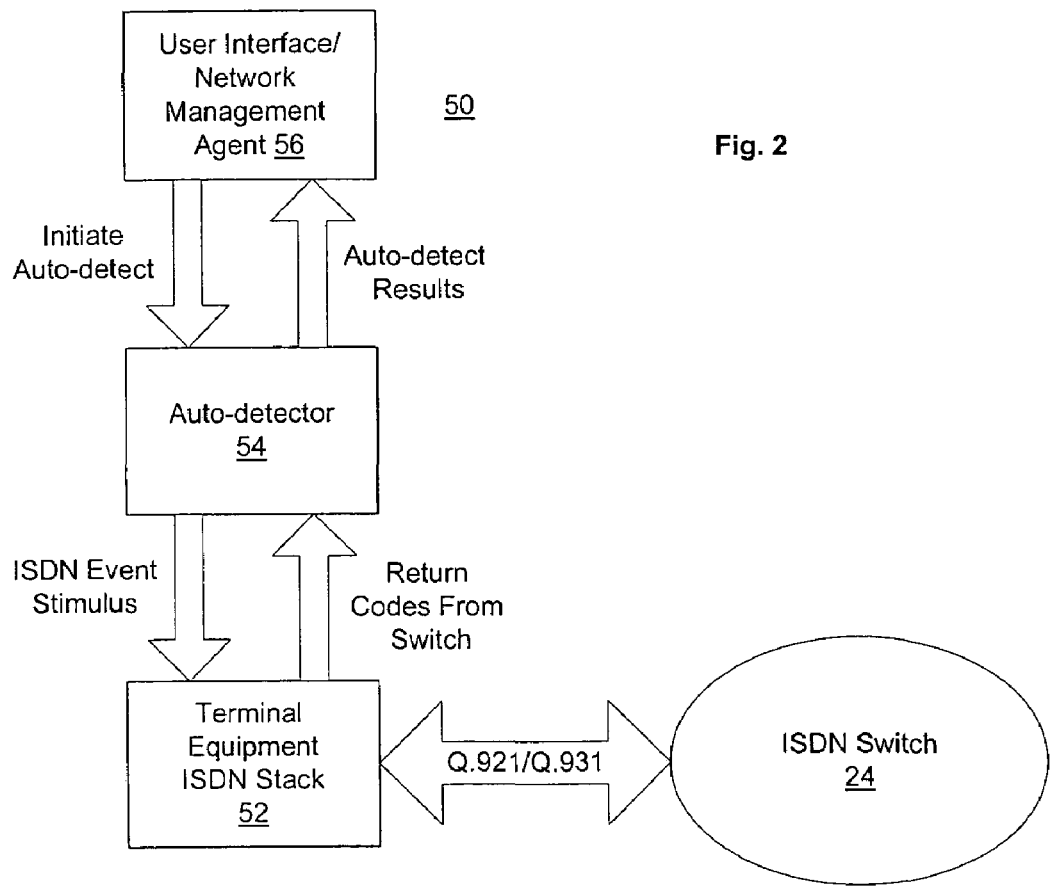
FIG. 2 shows message flow for an auto-detection process according to one embodiment of the invention.

Referring now to FIG. 2, message flow for one embodiment of the invention is depicted. In this embodiment, terminal equipment 50 runs several processes, including ISDN stack 52, auto-detector 54, and user interface 56. User interface 56 initiates the auto-detect sequence, when requested by a user, by signaling auto-detector 54 to detect either the availability of a single supplementary service/feature, or of all such services/features. Assuming for purposes of this illustration that auto-detection of a single service is requested, auto-detector 54 generates an appropriate stimulus to ISDN stack 52, triggering an ISDN event that can be used to test the service or feature. ISDN stack 52 and ISDN switch 24 pass Q.921/Q.931 messages related to the event, resulting in one or more codes being returned to auto-detector 54. Auto-detector 54 evaluates these codes to determine whether the service auto-request was successfully granted, and passes an indication of service availability to user interface 56.

Figure 3:
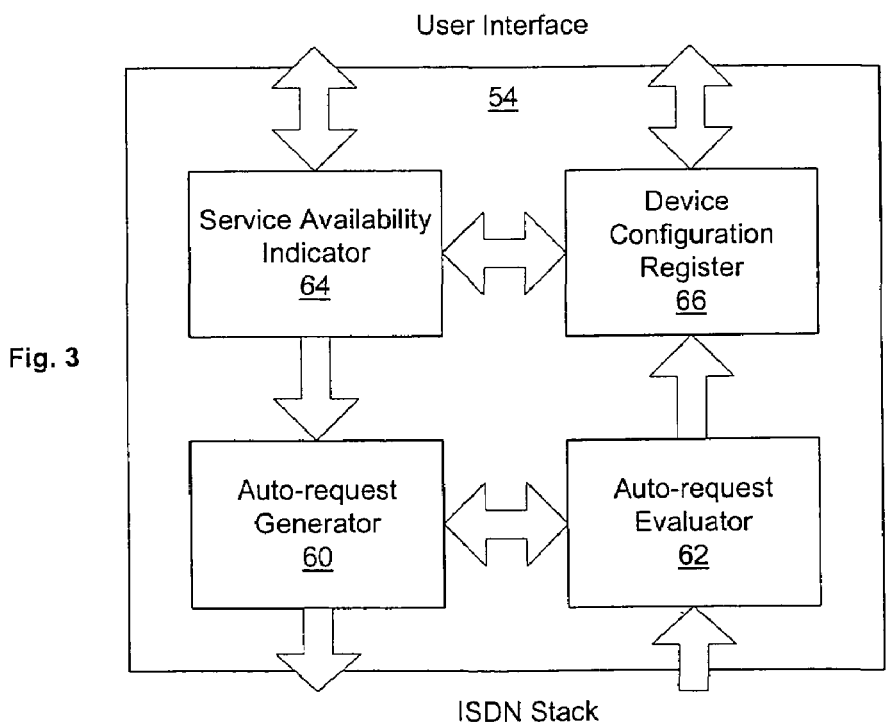
FIG. 3 shows blocks for an auto-detect according to another embodiment of the invention.

FIG. 3 shows a block diagram of one embodiment of auto-detector 54, illustrating several processes or threads that exist in this embodiment. During operation, service availability indicator 64 accepts requests from the user interface to initiate auto-detection of a supplementary service. Indicator 64 signals auto-request generator 60 that a service is to be tested, causing generator 60 to dispatch an appropriate stimulus to the ISDN stack.

Messages passed back from the ISDN stack are interpreted by auto-request evaluator 62. Generator 60 informs evaluator 62 of what was requested. Evaluator 62 compares the messages it receives from the ISDN stack to the expected messages for the requested event. When the message is expected in an intermediate step for the detection of the feature, evaluator 62 informs generator 60 that it can proceed with the next stimulus in the detection process. When the message conclusively determines the availability or unavailability of the service, evaluator 62 sets device configuration register 66 appropriately.

Device configuration register 66, as shown, can be accessed by service availability indicator 64 or by the user interface directly. In alternate implementations, only one of these paths need exist, and device configuration register 66 can even be maintained by a process separate from auto-detector 54. It is preferable, however, that auto-detector 54 be able to read from as well as write to this register, in order to examine prior auto-detect results and user configuration.

Figure 4:
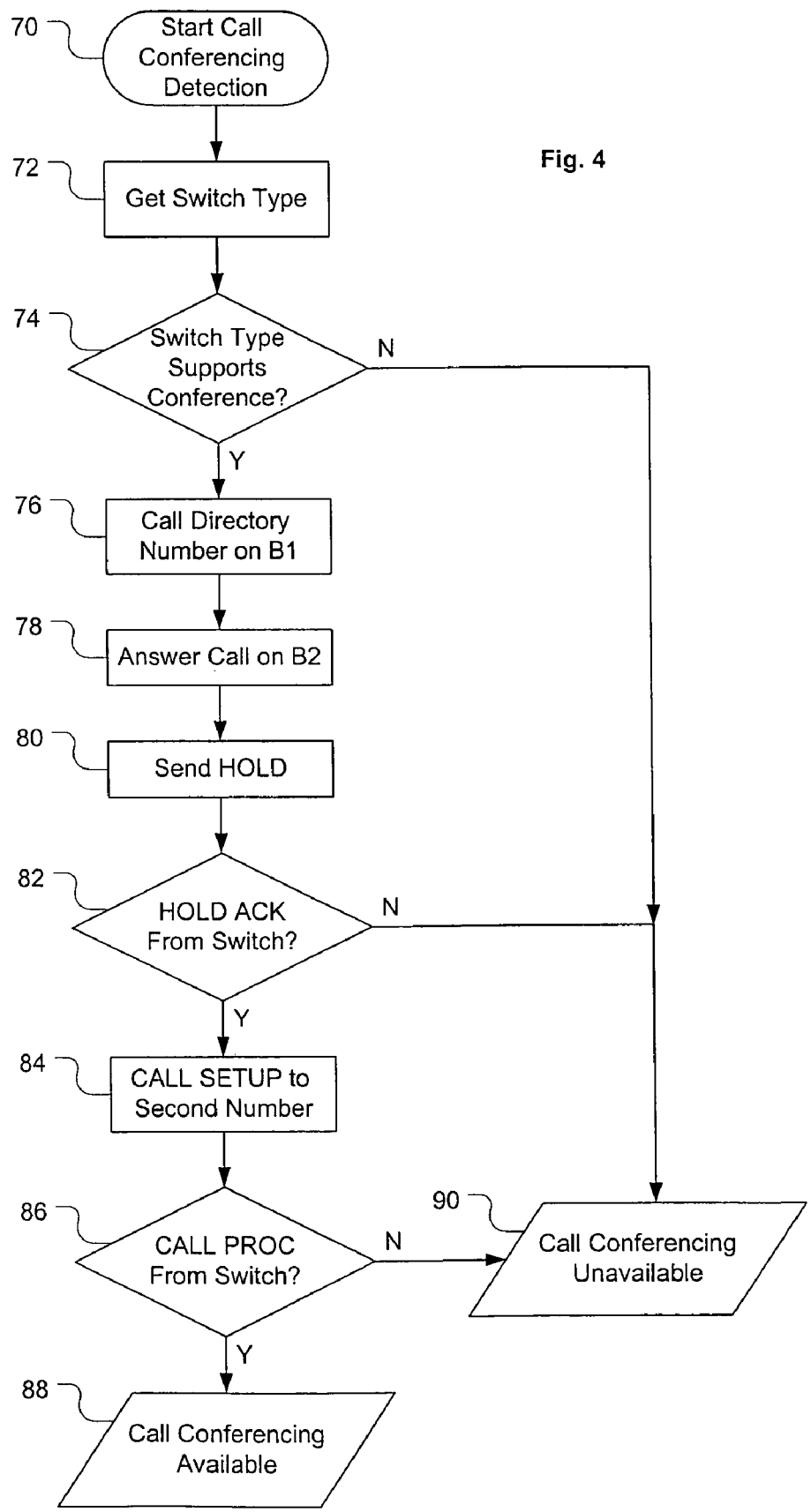
FIG. 4 shows a process for implementing auto-detection of a call conferencing feature according to an embodiment of the invention.

FIG. 4 shows an auto-detect process for one particular calling feature, i.e., call conferencing. In call conferencing, three (sometimes more) parties to a call can each hear all other parties and be heard by all other parties. In the embodiment of FIG. 4, the availability of this service is auto-detected by actually proceeding through the initial phases of a call conferencing setup using the ISDN connection's channels.

The process shown in FIG. 4 is initiated at block 70, e.g., when call conference service is to be detected as described above. At block 72, the ISDN switch type of the switch servicing the ISDN connection is retrieved—this may already exist in a device configuration register, or it can be discovered by a prior art automatic switch detection process. At block 74, if the switch type is known to not support conferencing, no further action will be taken and control will transfer to block 90 for indication that call conferencing is unavailable.

If the switch can possibly support conferencing, or its capabilities are unknown, a call is requested to one of the terminal equipment's directory numbers (it may have one or more directory numbers assigned). For instance, in block 76 an outgoing call using bearer channel B1 is initiated by appropriate D-channel signaling. Since the call is to the equipment's own directory number, D-channel signaling for an incoming call will also be received, and the call is answered using bearer channel B2 at block 78. At this point, a two-way call using both ISDN B channels has been set up.

Once the two-way call has been set up, the auto-detector next attempts to place one end of the call on hold at block 80. For instance, the "calling" end associated with B1 can request a HOLD, or the "called" end associated with B2 can request the HOLD. If the hold request is successful, a HOLD ACK should be received from the switch (note that this also indicates that the call hold feature is available). If HOLD ACK is not received, control is transferred at block 82 to block 90 for indication that call conferencing (and possibly call hold) is unavailable, since the first call could not be placed on hold.

When HOLD ACK is received, block 82 transfers control to block 84 for call setup to a second number. If the ISDN connection has more than one directory number, this call can be directed to the second number. Another possibility for call direction is a pre-programmed 1-800 number. In either case, it is not necessary that the second connection actually be completed.

Block 86 looks for a CALL PROC message from the switch, indicating that the second call setup is proceeding. When a CALL PROC message is received, the auto-detect process can abort connection of the second call and transfer control to block 88 for indication that call conferencing is available. If the call does not proceed, control is transferred to block 90 for indication that call conferencing is unavailable.

It may be possible that call conferencing availability depends on whether the endpoint requesting conferencing is the "calling" or "called" party. Both cases can be tested by proceeding through block 86 by requesting the hold on B1, and then taking the line off hold, returning to block 80, and repeating steps 80–86 by requesting the HOLD and CALL SETUP on B2.

Other supplementary calling features can be tested in a manner similar to that shown in FIG. 4. For instance, the call waiting feature signals that a call is incoming on a directory number that is already in use. This feature can be tested by setting up a first call (e.g., to a known number) using the directory number to be tested as the outgoing number, and then setting up a second call to the directory number using the other B channel. If the feature is enabled, D channel signaling should be received indicating that an incoming call is waiting. The auto-detect process can end at this point, or the auto-detector can execute a switchover from the first to the second call and evaluate the success of the switchover. Likewise, the disable call waiting feature can be tested by initiating the first call with a proper disabling prefix digit string, and then testing that a busy signal is received on the second call.

Examples of other features that can be detected with two directory numbers are call transfer and call forward. Call transfer can be detected by initiating a first call using B1 to one of the directory numbers, answering the "incoming" call on B2, placing the incoming call on hold and requesting that it be transferred to the other directory number. This should generate appropriate D-channel signaling indicating whether the feature is available. Likewise, call forwarding can be detected by requesting that calls to one directory number be directed to the other, placing a call to the forwarded number and looking for signaling indicating that a call is incoming on the second directory number.

A second group of supplementary services that can be detected in an embodiment of the invention are the D-channel data services, particularly X.25/D packet data service. Since it is highly unlikely that signaling traffic will ever require 6 kbps or more of the D-channel bandwidth, ISDN allows the excess capacity of the D channel to be allocated for data transfer. X.25/D packet data service can use up to 9.6 kbps of the 16 kbps capacity of the D channel for data transfer according to the X.25 packet format.

All traffic over the D channel uses a frame-based link-layer protocol known as LAPD (Link Access Protocol-D channel), as defined in Q.921. This service, when available, should support multiple logical LAPD connections. The connection to which a particular frame belongs is determined by examining several frame fields, including the service access point identifier (SAPI) and the terminal endpoint identifier (TEI).

The SAPI identifies the higher-layer protocol embedded in the data field of the frame. For instance, SAPI=0 identifies the frame as a call control frame that manages the B channels, SAPI=16 identifies the frame as an X.25 frame, and SAPI=63 is used for layer 2 TEI assignment.

The TEI identifies an ISDN device. When several devices use the same ISDN link (i.e., share a common S-interface), the TEI allows them to be distinguished. Thus on that interface, the TEI for each connected device must be unique, although a device may support multiple TEIs (e.g., one for each B-channel and one for X.25/D-channel data transfer). TEIs from 0 to 63 can be fixed by the ISDN service provider. TEIs from 64 to 126 are available for use during automatic TEI assignment using the Q.921 management functions. And TEI=127 is a broadcast TEI that can be used by devices having no assigned TEI.

Referring to FIG. 5, the X.25/D detection process is initiated at block 100. At block 102, an Identity Request message is sent to the network. This Q.921 frame requests a TEI to be used with X.25/D services, by including in the frame fields a SAPI of 16, a "dummy" placeholder for the TEI, and an Action Indicator (Ai) of 127. An Ai of 127 indicates that a TEI is being requested.

At block 104, the Q.921 frame received from the network is examined. If a TEI was automatically assigned, the Q.921 frame will contain an Identity Assigned message that will indicate the assigned TEI. In this instance, X.25/D service is available, and this can be indicated by a transfer of control to block 118. The network may alternately return an Identity Denied message, which could indicate that X.25/D service is unavailable. But the Identity Denied message could also indicate that a fixed or automatic TEI has already been assigned to this equipment.

To check the latter case, a message-generating loop steps through the possibilities for a pre-assigned TEI. Specifically, one possible implementation of this loop is shown at blocks 106–114. Block 106 sets a TEI of 0. An Identity Request message is then transmitted to the network, as a Q.921 frame with the fields SAPI=16, TEI=TEI, and Ai=127, at block 108. A decision block 110, similar to decision block 104, checks the return message from the switch. If the return message indicates success, X.25/D service is available at TEI=0, and control can be passed to block 118 for indication.

If the return message indicates failure, other values of TEI are tried. The value of TEI is incremented by one at block 112, and block 108 executes again. When TEI steps out of the valid assignment range (i.e., TEI=127), block 114 detects the condition. At this point, it is finally conclusively determined that the X.25/D service is unavailable, and control is passed to block 116 for an appropriate indication of the lack of service.

An auto-detector according to an embodiment of the invention can be activated in a number of ways. Terminal equipment can include an "auto-detect" or "auto-configure" button, or its equivalent as a selectable option in software. The auto-detector can be activated when the system boots after initial connection to an ISDN line, or after a loss of configuration memory. Or, the auto-detector can be activated from a debugger or other diagnostic tool. The auto-detect can be configured to detect all known secondary features, or a selectable subset.

The auto-detector can be implemented in a variety of types of terminal equipment. For instance, an ISDN telephone can use the auto-detector to configure supplementary call features. An ISDN terminal adapter can provide an analog phone user with voice messages, etc., if the user tries to access a feature that is not implemented at the switch. And PBX or router equipment can use the auto-detector for auto-configuration, setting up the fields in a configuration database for a network management agent, or during diagnostics.

The disclosed embodiments presented herein are exemplary. Although the embodiments are illustrated using specific ISDN protocols, it is recognized that modifications to and/or substitutions for these protocols may occur in the future, and the use of any specific protocol herein is for convenience of description. Furthermore, the protocol level at which an auto-detect process communicates with the ISDN stack can be varied to suit the requirements of specific implementations, e.g., some auto-detect features are more appropriate as a layer 3 entity, others are more appropriate as an entity at layer 4 or above, etc. It is also recognized that systems implementing the invention can be distributed, i.e., that software/hardware used during auto-detection may be divided into several sections, residing respectively on multiple physically separate but network-connected platforms. Various other modifications to the disclosed embodiments will be obvious to those of ordinary skill in the art upon reading this disclosure, and are intended to fall within the scope of the invention as claimed.

What is claimed is:

1. An ISDN terminal endpoint comprising:
an ISDN network interface capable of supporting at least first and second B-channels and one D-channel;
means for auto-generating a D-channel call setup request to initiate a first call, using the first B-channel, to a directory number associated with the ISDN terminal equipment;
means for auto-answering the first call using the second B-channel;
means for auto-generating a D-channel hold request for one of the B-channels connected to the first call;
means for, if the hold is acknowledged, auto-generating a second D-channel call setup request using the B-channel of the hold request, and receiving an acknowledgment across the D-channel related to the second D-channel call setup request; and
means for evaluating the acknowledgement to determine whether a call conferencing ISDN supplementary service is available.

2. The ISDN endpoint of claim 1, wherein the acknowledgment comprises, when the call conferencing service is available, a call establishment message from the ISDN network for the second call.

3. An ISDN endpoint comprising:
an ISDN network interface capable of supporting at least first and second B-channels and one D-channel;
means for auto-generating a D-channel call setup request to initiate a first call, using the first B-channel, to a directory number associated with the ISDN terminal equipment;
means for auto-answering the first call using the second B-channel;
means for auto-generating a D-channel hold request for one of the B-channels connected to the first call;
means for receiving an acknowledgment across the D-channel related to the D-channel hold request; and
means for evaluating the acknowledgment to determine whether a call hold ISDN supplementary service is available.

4. An ISDN endpoint comprising:
an ISDN network interface capable of supporting at least first and second B-channels and one D-channel;
means for auto-generating a D-channel call setup request to initiate a first call, using the first B-channel, to a directory number associated with the ISDN terminal equipment;
means for auto-answering the first call using the second B-channel;
means for auto-generating a D-channel hold request for one of the B-channels; and,
means for, if the hold is acknowledged, auto-generating a D-channel call transfer request to initiate a second call using the B-channel of the hold request to a second directory number associated with the ISDN terminal equipment, and receiving an acknowledgment across the D-channel related to the call transfer request; and
evaluating the acknowledgment to determine whether a call transfer ISDN supplementary service is available.

5. The ISDN endpoint of claim 4, wherein the acknowledgment comprises, when the call transfer service is available, a call setup message from the ISDN network for the second call.

6. An ISDN endpoint comprising:
an ISDN network interface capable of supporting at least first and second B-channels and one D-channel;
means for auto-generating a D-channel call setup request to initiate a first call, using the first B-channel, to a first number;
means for auto-generating a second D-channel call setup request to initiate a second call using the second B-channel to the originating directory number associated with the first call;
means for receiving an acknowledgment across the D-channel related to the auto-request; and
means for evaluating the acknowledgment to determine whether a call waiting ISDN supplementary service is available.

7. The ISDN endpoint of claim 6, wherein the acknowledgment comprises, when the call waiting service is available, a message from the ISDN network that a second call is incoming to the originating directory number.

8. An ISDN terminal endpoint comprising:
a customer end ISDN device and an ISDN network interface capable of supporting at least first and second B-channels and one D-channel;
means for auto-generating a call forward request to forward calls directed to a first directory number associated with the terminal equipment to a second directory number associated with the terminal equipment; and
means for auto-generating a D-channel call setup request to initiate a first call to the first directory number;
means for receiving an acknowledgment across the D-channel related to the call setup request; and
means for evaluating the acknowledgment to determine whether the call forward request was successful.

9. An ISDN terminal endpoint comprising:
a customer end ISDN device and an ISDN network interface capable of supporting at least first and second B-channels and one D-channel;
means for transmitting an auto-request, for an ISDN transaction that exercises an X.25/D channel packet data feature ISDN supplementary service, to an ISDN switch of the ISDN network across the D-channel, wherein transmitting an auto-request comprises generating an identity request for an auto-assigned X.25/ID channel identity from the ISDN network;
means for receiving an acknowledgment across the D-channel related to the auto-request, wherein the acknowledgment comprises, when the service is available, a message from the ISDN network indicating that an X.25 D channel has been assigned; and
means for evaluating the acknowledgment to determine whether the X.25/D channel packet data feature ISDN supplementary service is available.

10. The ISDN terminal endpoint of claim 9, further comprising means for stepping through a range of possible terminal equipment identifiers, when the auto-request for an auto-assigned X.25/D channel identity is denied, and for each identifier in the range, generating an identity request for an X.25/D channel identity using that identifier, and determining that the X.25/D channel packet data feature is available when any one of the identity requests is acknowledged by a message from the ISDN network indicating that an X.25 D channel has been assigned.

11. An article of manufacture containing computer instructions that, when executed by a processor, cause the processor to perform a method for operating ISDN terminal equipment connected to an ISDN network via an interface having at least two B-channels and one D-channel, the method comprising:

transmitting an auto-request, for an ISDN transaction that exercises a call conferencing ISDN supplementary service, to the ISDN network across the D-channel, wherein transmitting an auto-request comprises:

generating a D-channel call setup request to initiate a first call, using the first B-channel, to a directory number associated with the ISDN terminal equipment;

answering the first call using the second B-channel;

generating a D-channel hold request for one of the B-channels; and, if the hold is acknowledged, initiating a second call using the B-channel of the hold request;

receiving an acknowledgment across the D-channel related to the auto-request; and evaluating the acknowledgment to determine whether the auto-request was successful.

12. The article of manufacture of claim 11, wherein the acknowledgment comprises, when the service is available, a call establishment message from the ISDN network for the second call.

13. An article of manufacture containing computer instructions that, when executed by a processor, cause the processor to perform a method for operating ISDN terminal equipment connected to an ISDN network via an interface having at least two B-channels and one D-channel, the method comprising:

transmitting an auto-request, for an ISDN transaction that exercises a call hold ISDN supplementary service, to the ISDN network across the D-channel, wherein transmitting an auto-request comprises:

generating a D-channel call setup request to initiate a first call, using the first B-channel, to a directory number associated with the ISDN terminal equipment;

answering the first call using the second B-channel; and generating a D-channel hold request for one of the B-channels;

receiving an acknowledgment across the D-channel related to the auto-request, wherein the acknowledgment comprises, when the service is available, a hold acknowledgment message from the ISDN network; and evaluating the acknowledgment to determine whether the auto-request was successful.

14. An article of manufacture containing computer instructions that, when executed by a processor, cause the processor to perform a method for operating ISDN terminal equipment connected to an ISDN network via an interface having at least two B-channels and one D-channel, the method comprising:

transmitting an auto-request, for an ISDN transaction that exercises a call transfer ISDN supplementary service, to the ISDN network across the D-channel, wherein transmitting an auto-request comprises:

generating a D-channel call setup request to initiate a first call, using the first B-channel, to a directory number associated with the ISDN terminal equipment;

answering the first call using the second B-channel;

generating a D-channel hold request for one of the B-channels; and, if the hold is acknowledged, initiating a second call using the B-channel of the hold request to a second directory number associated with the ISDN terminal equipment;

receiving an acknowledgment across the D-channel related to the auto-request; and evaluating the acknowledgment to determine whether the auto-request was successful.

15. The article of manufacture of claim 14, wherein the acknowledgment comprises, when the service is available, a call setup message from the ISDN network for the second call.

16. An article of manufacture containing computer instructions that, when executed by a processor, cause the processor to perform a method for operating ISDN terminal equipment connected to an ISDN network via an interface having at least two B-channels and one D-channel, the method comprising:

transmitting an auto-request, for an ISDN transaction that exercises a call waiting ISDN supplementary service, to the ISDN network across the D-channel, wherein transmitting an auto-request comprises:

generating a D-channel call setup request to initiate a rust call, using the first B-channel, to a first number; and, initiating a second call using the second B-channel to the originating directory number associated with the first call;

receiving an acknowledgment across the D-channel related to the auto-request; and evaluating the acknowledgment to determine whether the auto-request was successful.

17. The article of manufacture of claim 16, wherein the acknowledgment comprises, when the service is available, a message from the ISDN network that a second call is incoming to the originating directory number.

18. An article of manufacture containing computer instructions that, when executed by a processor, cause the processor to perform a method for operating ISDN terminal equipment that is a customer-end ISDN device connected to an ISDN network via an interface having at least two B-channels and one D-channel, the method comprising:

transmitting an auto-request, for an ISDN transaction that exercises a call forwarding ISDN supplementary service, to an ISDN switch of the ISDN network across the D-channel, wherein transmitting an auto-request comprises:

generating a call forward request to forward calls directed to a first directory number associated with the terminal equipment to a second directory number associated with the terminal equipment; and placing a call to the first directory number;

receiving an acknowledgment across the D-channel related to the auto-request; and evaluating the acknowledgment to determine whether the auto-request was successful.

19. An article of manufacture containing computer instructions that, when executed by a processor, cause the processor to perform a method for operating ISDN terminal equipment connected to an ISDN network via an interface having at least two B-channels and one D-channel, the method comprising:

transmitting an auto-request, for an ISDN transaction that exercises an X.25/D channel packet data feature ISDN supplementary service, to the ISDN network across the D-channel, wherein transmitting an auto-request comprises generating an identity request for an auto-assigned X.25/D channel identity from the ISDN network;

receiving an acknowledgment across the D-channel related to the auto-request, wherein the acknowledgment comprises, when the service is available, a message from the ISDN network indicating that an X.25 D channel has been assigned; and evaluating the acknowledgment to determine whether the auto-request was successful.

20. The article of manufacture of claim 19, the method further comprising, when the request for an auto-assigned X.25/D channel identity is denied, stepping through a range of possible terminal equipment identifiers, and for each identifier in the range, generating an identity request for an X.25/D channel identity using that identifier, and determining that the X.25/D channel packet data feature is available when any one of the identity requests is acknowledged by a message from the ISDN network indicating that an X.25 D channel has been assigned.

* * * * *

UNITED STATES PATENT AND TRADEMARK OFFICE
CERTIFICATE OF CORRECTION

| | | |
|---|---|---|
| PATENT NO. | : 6,990,125 B1 | Page 1 of 1 |
| APPLICATION NO. | : 10/684161 | |
| DATED | : January 24, 2006 | |
| INVENTOR(S) | : Fedane | |

It is certified that error appears in the above-identified patent and that said Letters Patent is hereby corrected as shown below:

At column 8, line 45, please replace "X.25/ID" with --X.25/D--
At column 10, line 17, please replace "rust" with --first--

Signed and Sealed this

Ninth Day of January, 2007

JON W. DUDAS
*Director of the United States Patent and Trademark Office*